Patented Sept. 29, 1936

2,055,686

UNITED STATES PATENT OFFICE 2,055,686

METHOD OF REMOVING IMPURITIES FROM DYESTUFFS

Karl F. Conrad, Buffalo, N. Y., assignor to National Aniline & Chemical Company, Inc., New York, N. Y., a corporation of New York No Drawing. Application March 7, 1934, Serial No. 714,453

12 Claims. (Cl. 260—71)

This invention relates to the preparation of dyestuffs which do not color artificial silk comprising acyl derivatives of cellulosic material, from dyestuffs which ordinarly do not dye said cellulosic derivatives but which contain impurities causing staining of said cellulosic derivatives.

Artificial silks prepared from acyl derivatives of cellulosic material, such as the carboxylic acid esters of cellulose, are made into textile materials, such as filaments, threads, yarns, or so-called union goods and the like, which also contain cotton fibres. In order to obtain various colored effects, such mixed textile materials are sometimes dyed with dyestuffs having affinity for cotton but having no, or scarcely no, affinity for the artificial silk. Many of the dyestuffs which would otherwise be suitable for dyeing such mixed textile materials contain impurities which stain the artificial silk, thereby rendering said dyestuffs unsuitable for the purpose.

An object of the present invention is to provide a process for the removal of impurities which stain acyl derivatives of cellulose from water soluble dyestuffs which have an affinity for cotton but which in a purified state normally have no affinity for said artificial silks.

Other objects of the present invention in part will be obvious and in part will appear hereinafter.

I have found, according to the present invention, that impurities which stain artificial silks comprising acyl derivatives of cellulosic material may be removed from water-soluble dyestuffs of the said type (those which in a purified state have affinity for cotton but normally have no affinity for acyl derivatives of cellulosic material) by treatment of an aqueous solution of said impure dyestuff with a highly porous, solid adsorbent. As purifying agents there may be employed such adsorbents as active carbons derived from vegetable or animal sources, such as those highly active charcoals useful as adsorbents in gas-masks, vapor-recovery processes and the like, bone-black, and the like material. As specific examples of the purifying agents there may be mentioned the adsorbent charcoals prepared from vegetable materials (e. g., those known in the trade as "Darco", "Norit", "Nuchar", etc.). I have found that the impurities which cause staining of said artificial silks are retained by the said solid adsorbents while the dyestuff is mainly left in solution, and accordingly that a separation of the impurities may be readily effected by separation of the treated solution from the adsorbent.

In the practice of the present invention the dyestuff to be purified, as for example, a water soluble cotton dye, preferably one which in the free state contains one or more acid salt-forming groups (e. g., a sulfonic acid and/or a carboxylic acid group), which is contaminated by one or more impurities which stain acyl derivatives of cellulosic material (as for example, cellulose formate, cellulose acetate, cellulose propionate, cellulose butyrate or other carboxylic acid derivatives of cellulose, etc.), is treated in aqueous solution with an adsorbent of the type herein described, preferably with the aid of heat; and the resulting solution is separated from the adsorbent as for example, by filtration, centrifugal separation, and the like. The dyestuff may then be recovered from the separated solution in a form substantially free from impurities which cause staining of said artificial silks, as for example, by salting-out, evaporation, etc.

Without limiting my invention to any specific theories it appears probable that the dyestuffs which have affinity for cotton and which stain the said artificial silks are mainly dyestuffs containing an acid salt-forming group and which are derived from basic compounds or during their course of manufacture give rise to the formation of basic compounds, and that such basic compounds are present as impurities in the dyestuff. It appears that the said basic compounds which do not themselves directly dye cotton, have an affinity for artificial silks comprising acyl derivatives of cellulosic material and hence, even when present in small amounts, cause staining of said artificial silks. By my process the said basic compounds appear to be adsorbed or absorbed by the adsorbent, while the dyestuff itself is mainly left in solution; so that by separating the adsorbent from the treated solution the solution may be obtained in a purified form from which the dyestuff may be recovered in a purified form.

The invention will be illustrated by the following specific examples in which the parts are by weight and temperatures are in degrees centigrade. It will be realized by those skilled in the art that the invention is not limited thereto, however, except as indicated in the appended patent claims.

*Example I.*—34 parts of Erie Fast Brown B (C. I. No. 561), containing impurities which result in the staining of cellulose acetate fibers when the dyestuff is employed in the usual manner as a direct dye for cotton fibers having the cellulose acetate fibers mixed therewith, are dissolved in 850 parts of water. To the solution are added 3 parts of a highly active adsorbent charcoal derived from willow wood (e. g., that known in the trade as "Norit"), in powder form, and the mixture is heated with agitation to a temperature of about 65° to about 75°. The heating is carried out for about 5 to 10 minutes. To the resulting mixture 5 parts of a filter-aid, such as an infusorial earth (e. g., that known in the trade as "Filter-Cel"), are added and the mixture is boiled for about 10 to 20 minutes. The resulting mass is then filtered, and the filtrate is made acid to litmus by the addition of hydrochloric acid. The dyestuff in a purified condition is obtained from the resulting solution by the addition of common salt (NaCl) to the saturation point, followed by recovery of the precipitated dyestuff by filtration. The resulting purified dyestuff when employed to dye cotton fibers in admixture with cellulose acetate fibers produces substantially no staining of the cellulose acetate fibers.

*Example II.*—25 parts of Erie Black GXOO (C. I. No. 581), in the form of a dried press cake produced in the course of its manufacture, are dissolved in 450 parts of water and 1.25 parts of sodium carbonate, 5 parts of the vegetable charcoal employed in Example I are added, and the mixture is heated to boiling. 3 parts of the infusorial earth employed in Example I are added to the boiling mixture and boiling is continued for an additional period of about 5 minutes. The mass is then cooled to about 80° and filtered. The dyestuff is obtained from the filtrate in a purified condition by the addition of common salt (about 110 parts) followed by separation of the precipitated dyestuff by filtration. The resulting dyestuff when employed to dye cotton fibers in admixture with cellulose acetate fibers produces substantially no staining of the cellulose acetate.

Other water soluble dyestuffs which have an affinity for cotton and which in a purified state normally have no affinity for artificial silks of the type hereinbefore referred to, but which contain impurities that cause staining of said artificial silks, may be treated in accordance with the foregoing examples for the removal of said impurities. The invention is of particular importance in connection with the removal of impurities which are regarded as of a basic nature from water soluble dyestuffs for cotton which in the free state contain an acid salt-forming group, and especially azo dyestuffs which are salts of sulfonic and/or carboxylic acids. As additional illustrative specific instances of dyestuffs which may be purified in accordance with the present invention, there may be mentioned Erie Fast Brown 3RB (C. I. No. 420), Erie Brown 3GN (C. I. 596), Erie Green MT (C. I. No. 593), Erie Black NRX (C. I. No. 539), Erie Black BF (C. I. No. 582).

The purification may be carried out during the course of manufacture of the dyestuff, as well as by the treatment of the dyestuff in the form of a manufactured product. Thus, a solution of the dyestuff as produced during the course of its manufacture may be treated with the adsorbent in accordance with the present invention, and the dyestuff may then be isolated therefrom in a purified condition. The purification treatment may also be employed in conjunction with the dyeing process in which the dyestuff is employed; as for example by treating a dye bath of the impure dyestuff with the adsorbent, separating the adsorbent containing impurities from the treated dye bath, and employing the resulting dye bath in the dyeing process.

The adsorbent may be employed in the form of a powder or lumps or granules. The amount of adsorbent employed is obviously not limited to the specific amounts given in the foregoing example. Ordinarily about 5 per cent of the adsorbent, based on the weight of the dyestuff treated, is sufficient to effect a purification. In some cases, however, a greater amount may be necessary. It is noted that the use of the adsorbent may result in some loss of the dyestuff by retention of the solution in the adsorbent, and hence for economical operation an unnecessary excess should preferably be avoided.

If desired, a filter-aid may be employed in conjunction with the adsorbent, especially when the latter is employed in the form of a powder, to aid in the separation of the adsorbent from the solution; as for example, Filter-Cel, kieselguhr, and the like. The use of a filter-aid is not essential to the purification, however.

The treatment may be carried out at ordinary temperatures or with the aid of heating. Heating is preferably employed inasmuch as it appears to increase the rapidity of the removal of impurities and facilitates the separation of the adsorbent from the treated solution.

I claim:

1. The method of removing impurities which stain artificial silk comprising an acyl derivative of cellulosic material from a water soluble dyestuff dyeing cotton direct and having in the free state one or more acid salt forming groups, which dyestuff normally has no affinity for said artificial silk and contains such impurities, which comprises treating a solution of the impure dyestuff in water with a highly porous, solid adsorbent.

2. The method of removing impurities which stain artificial silk comprising an acyl derivative of cellulosic material from a water soluble dyestuff dyeing cotton direct and having in the free state one or more acid salt forming groups, which dyestuff normally has no affinity for said artificial silk and contains such impurities, which comprises treating a solution of the impure dyestuff in water with an active carbon adsorbent, and separating the treated solution from the adsorbent.

3. The method of purifying a water soluble dyestuff having in the free state one or more acid salt forming groups and dyeing cotton direct, which dyestuff normally has no affinity for artificial silk comprising an acyl derivative of cellulose material and contains impurities that cause staining of such artificial silk when cotton fiber is dyed with the impure dyestuff in the presence of said artificial silk, which comprises heating a solution of the impure dyestuff in water with an active carbon adsorbent, separating the treated solution from the adsorbent, and recovering the dyestuff in a purified condition from the solution.

4. The method of removing impurities which stain artificial silk comprising an acyl derivative of cellulosic material from a water soluble dyestuff dyeing cotton direct, which dyestuff normally has no affinity for said artificial silk and contains a relatively small proportion of such impurities, which comprises the step of treating a solution of the impure dyestuff with an amount of a highly porous, solid adsorbent not substantially in excess of that necessary substantially to remove the impurities.

5. The method of removing impurities which stain artificial silk comprising an acyl derivative of cellulosic material from a water soluble dyestuff dyeing cotton direct, which dyestuff normally has no affinity for said artificial silk and contains a relatively small proportion of such impurities, which comprises the step of treating a solution of the impure dyestuff with an amount of active carbon adsorbent not substantially in excess of that necessary substantially to remove the impurities.

6. The method of removing impurities which stain artificial silk comprising an acyl derivative of cellulosic material from a water-soluble dyestuff which dyes cotton direct, which normally has no affinity for said artificial silk and which contains such impurities, comprising heating a solution of the impure dyestuff in water with a highly active charcoal adsorbent, separating the treated solution from the adsorbent, and salting out the dyestuff from the resulting solution.

7. The method of removing impurities which stain cellulose acetate fibers from a water soluble azo dyestuff which contains at least one radical of the class consisting of the salts of the sulfo and carboxy groups, which normally has no affinity for said cellulose acetate fibers and which contains such impurities, which comprises heating a solution of the impure dyestuff in water with an active carbon adsorbent, separating the treated solution from the adsorbent, and salting out the dyestuff from the resulting solution.

8. The method of removing impurities which stain cellulose acetate fibers from a water soluble azo dyestuff which contains at least one radical of the class consisting of the salts of the sulfo and carboxy groups, which normally has no affinity for said cellulose acetate fibers and which contains such impurities, which comprises heating a solution of the impure dyestuff in water with a highly active vegetable charcoal adsorbent in powder form, filtering the resulting mass with the assistance of a filter-aid, and salting out the dyestuff from the resulting solution.

9. The method of purifying an azo dyestuff dyeing cotton direct and normally having no affinity for acyl derivatives of cellulose but which contains impurities that stain said derivatives, which comprises the step of treating a solution of the impure dyestuff with a highly porous, solid adsorbent.

10. The method of purifying a polyazo dyestuff dyeing cotton direct and normally having no affinity for cellulose acetate but which contains impurities that stain cellulose acetate, which comprises treating a solution of the impure dyestuff with a decolorizing carbon, and separating the treated solution from the decolorizing carbon.

11. The method of removing impurities which stain artificial silk comprising an acyl derivative of cellulosic material from a water soluble azo dyestuff which contains at least one radical of the class consisting of the salts of the sulfo and carboxy groups, which normally has no affinity for said artificial silk and contains such impurities, which comprises the step of treating a solution of the impure dyestuff with a highly porous solid adsorbent.

12. The method of removing impurities which stain artificial silk comprising an acyl derivative of cellulosic material from a water soluble azo dyestuff which contains at least one radical of the class consisting of the salts of the sulfo and carboxy groups, which normally has no affinity for said artificial silk and contains such impurities, which comprises treating a solution of the impure dyestuff with a decolorizing carbon, and separating the treated solution from the decolorizing carbon.

KARL F. CONRAD.